March 15, 1960     G. G. RAMIREZ     2,928,501
STAIR CLIMBING DEVICE
Filed March 26, 1956                2 Sheets-Sheet 1
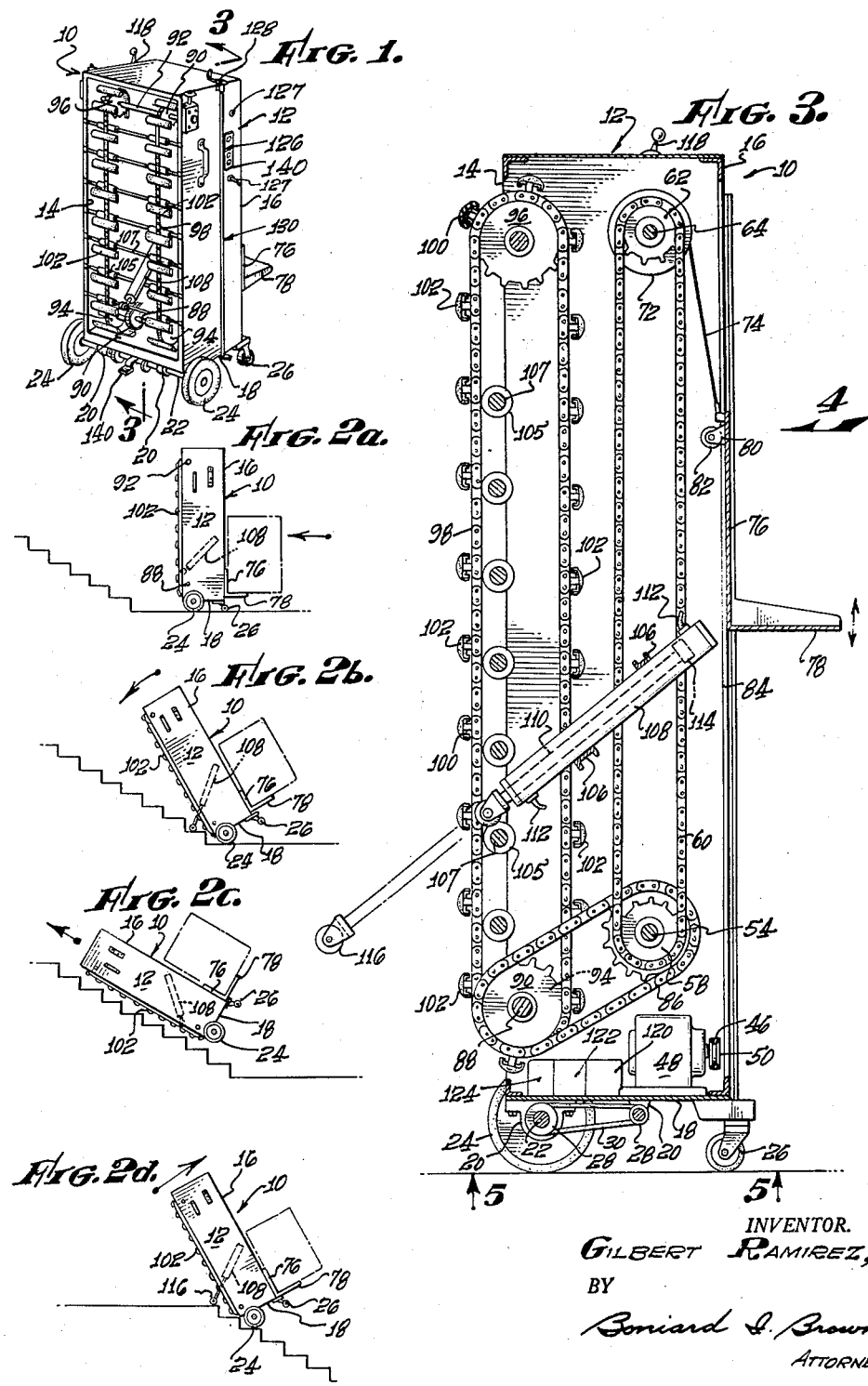
INVENTOR.
GILBERT RAMIREZ,
BY
Boniard J. Brown
ATTORNEY.

March 15, 1960   G. G. RAMIREZ   2,928,501
STAIR CLIMBING DEVICE
Filed March 26, 1956   2 Sheets-Sheet 2
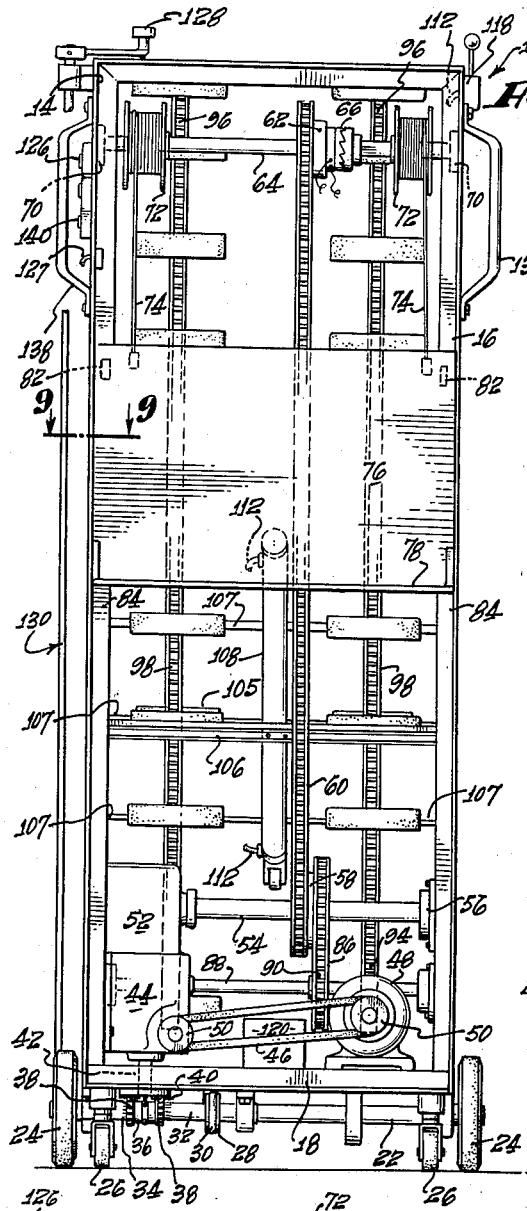
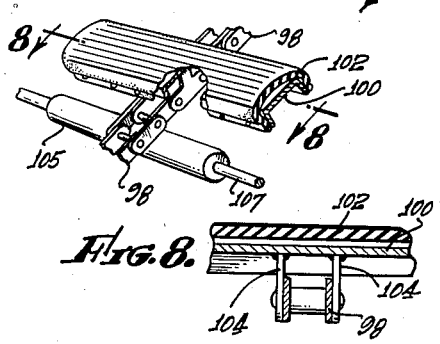
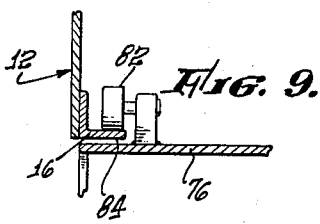
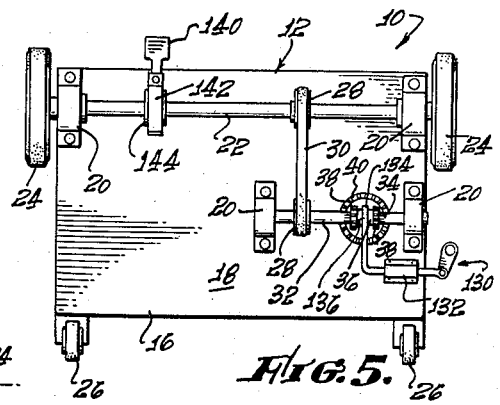
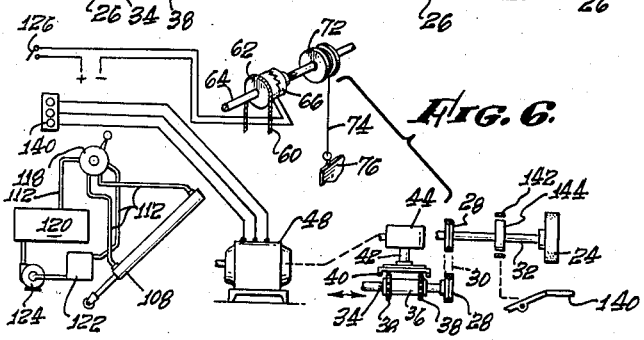
GILBERT RAMIREZ,
INVENTOR.
BY
Boniard J. Brown
ATTORNEY.

United States Patent Office 2,928,501
Patented Mar. 15, 1960

2,928,501
STAIR CLIMBING DEVICE
Gilbert G. Ramirez, Whittier, Calif.

Application March 26, 1956, Serial No. 573,791

8 Claims. (Cl. 187—11)

This invention relates generally to trucking equipment; more particularly it relates to a new and improved stair climbing device adapted for transporting loads up and down stairways.

The problem of handling heavy or large objects is a very important one in industrial, warehouse and moving operations in view of the high labor costs involved. The problem has resulted in the development and use of a variety of different types of material-handling equipment, such as the well-known industrial lift truck, which is used for stacking heavy objects and for moving such objects from one location to another. Unfortunately, material-handling equipment of the prior art is limited in application to use where the equipment may move on a level surface. Thus, present common devices for moving large bulky objects are of little or no utility where a large curbing has to be surmounted or where an object has to be moved up or down a stairway from one floor to another of a building or the like.

This problem of transporting objects or materials is particularly acute in cases where it is desired to transport appliances or the like, such as stoves or refrigerators, to the second floor or to a higher floor of a common domestic dwelling or other building which has no elevator which may be used for this purpose. Thus, it becomes necessary for an individual or individuals to lift the object being transported and to physically carry such object up a stairway. This process obviously involves arduous labor, considerable time, and high labor costs. It commonly involves the use of more than one person to perform the task. Such labor involves danger of personal injury, such as rupture.

The present invention provides a labor saving device which can be satisfactorily employed in virtually any location and which retains many of the advantages of common industrial lift trucks. As an example of its labor-saving features, load carrying means are provided on certain embodiments of the invention so that they may be used either to receive an object from an elevated truckbed, a platform, or the equivalent, at any common height or to place the object in any desired location at any common height. This is a very desirable feature, since it enables an operator easily to load an article, such as a refrigerator, from a truckbed onto a device of this invention. Further, a device as defined herein can be easily and conveniently used with a minimum of manual manipulation to transport such an article from a truckbed up a stairway like that within a house so that this article may be directly located in position for use. It is, therefore, an object of the invention to provide a climbing device which will facilitate the transporting of heavy and cumbersome objects up and down stairs or similar obstructions.

It is an object of the present invention to provide a climbing device which will enable an operator to move a large and/or heavy object with reduced physical effort so that danger of personal injury is minimized.

It is another object of the present invention to provide a labor-saving device which will minimize the labor involved in loading and unloading objects to and from various heights and in transporting objects up and down stairs or similar obstructions.

It is a further object of the present invention to provide a labor-saving device which can be satisfactorily employed in virtually any location and yet which retains many of the advantages of common industrial lift trucks.

Other objects and features of the present invention, as well as many advantages thereof, will become apparent to those versed in the art to which this invention pertains, from a consideration of the remainder of this description, the appended claims, and the accompanying drawings in which:

Figure 1 is a perspective view of a stair climbing device according to the present invention;

Figures 2a, 2b, 2c and 2d are diagrammatic views indicating the use of this device;

Figure 3 is a cross-sectional view taken at line 3—3 of Figure 1;

Figure 4 is a view of the back of this device, taken in the direction of the arrow 4 in Figure 3;

Figure 5 is a view of the bottom of this device;

Figure 6 is a digrammatic view of various power means employed with this device;

Figure 7 is an enlarged perspective view, partially in section, of a portion of an endess track employed with this device;

Figure 8 is a partial cross-sectional view taken at line 8—8 of Figure 7; and

Figure 9 is a cross-sectional view taken at line 9—9 of Figure 4.

Referring to the drawings and more particularly to Figures 1, 3 and 4, there is illustrated a stair climbing device 10 of the present invention. This device is formed with a generally rectangular housing 12 having an open front side 14 which is generally parallel to back side 16. Upon bottom 18 of housing 12 there is mounted, by means of bearings 20, shaft 22 which carries enlarged wheels 24 rigidly secured thereto. Upon the bottom 18 of housing 12 are also mounted two casters 26 which serve as wheels to aid in supporting the entire device 10 in an upright position.

Upon shaft 22 is mounted a common V-belt pulley 28 which is connected through V-belt 30 to another shaft 32, as shown in Figures 5 and 6. Shaft 32 is also mounted upon bottom 18 by means of bearings 20. It is formed with a splined portion 34 upon which is slidably mounted collar 36 having an internal configuration adapted for mating with splined portion 34. Upon the ends of collar 36 are secured gears 38 adapted to coact with ring gear 40 mounted adjacent to bottom 18 on shaft 42 which extends from gear box 44. Section 34, collar 36, gears 38 and ring gear 40 constitute what may be termed a "transmission" or "transmission means." It is obvious that this transmission means will provide means for selectively reversing the direction of rotation of the ground wheels or wheel means. Gear box 44 is positioned within housing 12 and is mounted thereon; it is connected by means of a V-belt 46 to reversible electric motor 48 mounted within housing 12. Pulleys 50 are used in a conventional manner so as to effect this interconnection.

As shown in Figure 4 a second gear box 52 is mounted upon gear box 44 so that a shaft (not shown) interconnects these two gear boxes. From gear box 52 there extends another shaft 54 which projects completely across housing 12 and is supported by bearing 56 mounted within this housing at a point remote from gear box 52. Double sprocket 58 is secured to shaft 54, as indicated in Figures 3 and 4 of the drawings. One sprocket of double sprocket 58 carries endless chain 60, the other end of chain 60 being supported upon another sprocket 62 rotatably mounted upon shaft 64. Shaft 64 is parallel to shaft 54 and carries a part of a magnetic clutch 66, as shown. The other part of clutch 66 is directly secured to sprocket 62 for a purpose which will be more fully apparent later.

Referring now to Figures 4 and 6, shaft 64 is carried on bearings 70 mounted within housing 12. Secured to shaft 64 are reels 72. Each of these reels is secured to an end of cable 74; the ends of cables 74 remote from reels 72 are attached to a generally L-shaped load carrying platform 76 having an extension 78 formed thereon for receiving a load. Platform 76 is provided, adjacent to its back surface, with brackets 80 which serve to rotatably carry small wheels 82 designed to engage the back surface of parallel flanges 84 mounted upon housing 12. Thus, these flanges in effect serve as guides or guide means to control the location of platform 76.

Another endless chain 86 is carried by sprocket 58 so as to interconnect shaft 54 with another shaft 88 by means of another sprocket 90. Shaft 88 is carried by bearings 92 mounted upon housing 12 in such manner as to be parallel to shafts 54 and 64. Shaft 88 is parallel to a still further shaft 92 mounted upon bearings (not shown) directly behind bearings 70 as device 10 is viewed in Figure 4. The two shafts 88 and 92 carry sprockets 94 and 96, respectively, which are designed to hold endless chains 98 so as to extend outwardly from back side 14 of housing 12. These endless chains 98 form part of what may be considered endless track means of the instant invention, inasmuch as they carry U-shaped metal brackets 100 to which are secured small pads 102 of rubber or similar material, as shown in Figures 7 and 8. Pads 102 are designed to engage the edge of a stair or the like when device 10 is operated, as will be described, so as to ascend or descend a stairway or the like. Brackets 100 are secured to individual links of chains 98 by means of small metal supports 104. The structure of a support 104 is best shown in Figure 8 of the drawings. Chains 98 are supported against transverse movement when device 10 is in operation by support rollers 105, each roller 105 being rotatably mounted in housing 12.

Referring to Figures 3, 4, and 6, mounted upon channels 106 within the housing 12 is hydraulic cylinder 108 in which there is mounted an arm 110 in such a manner that as hydraulic fluid is passed into either end of this cylinder through hydraulic lines 112 a piston 114 is caused to move within cylinder 108 moving arm 110. Thus, arm 110 may be extended to the position shown in phantom in Figure 4 of the drawings so that a small roller 116 pivotally mounted on the end of this arm extends out from housing 12 past the endless track means employed. This hydraulic cylinder is adapted to be operated by means of control valve 118 which is connected by other hydraulic lines 112 to conventional hydraulic accumulator 120, conventional hydraulic reservoir 122 and hydraulic pump 124. All of these hydraulic means are mounted within housing 12, as shown. Control valve 118 is mounted, as shown, outside of housing 12 so as to be readily accessible to an operator.

The operation of device 10 is comparatively simple. In use, device 10 may be positioned directly adjacent to the loading platform of a truck or the like so that a load may be placed upon extension 78 of load-carrying platform 76, as indicated in Figure 2a of the drawings. Platform 76 may be raised or lowered to any height which is convenient in locating a load in this position. The actual positioning of platform 76 may be effected by actuating magnetic clutch 66, hereinabove described, through the use of switch 126 mounted upon the exterior of housing 12, after the device 10 has been connected to an electric outlet by means of an electric cord 127, and after the motor 48 has been caused to rotate in a desired direction through the use of a motor control switch 140.

When a load has been placed upon the device 10, the device may be caused to move along a level surface by moving handle 128 so as to actuate connecting linkage 130 in order to slide part of this linkage within bracket bearing 132 on bottom 18 of housing 12. These components are best shown in Figures 4 and 5. When linkage 130 is thus actuated, an eye 134, adapted to seat in circumferential groove 136 in the collar 36, causes this collar to shift so as to locate either of the gears 38 in contact with the ring gear 40. Thus, power is transmitted to wheels 24 causing the device 10 to move along a level surface in a selected direction, obviously depending upon the direction of rotation of motor 48 and the direction in which the collar 36 has been moved. This movement of device 10 can be controlled by means of brake pedal 140 mounted on bottom 18 so as to tighten brake band 142 about cylinder 144 secured to shaft 22.

When the device 10, with a load thereon, has been positioned at the foot of a stairway, as indicated in Figure 2a, motor 48 is disengaged from wheels 24 and valve 118 is actuated so as to extend arm 110 to the position shown in phantom in Figure 3. Wheel 116 will then engage a stair of a staircase as indicated in Figure 2b and the device 10 may be lowered against the staircase to the position shown in Figure 2c, by appropriate manipulation of control valve 118. Simultaneously, the operator may guide the device 10 and may bear part of its weight as it lowers itself to the position shown in Figure 2c, by means of handles 138 located upon the exterior of the housing 12. Motor 48 causes the endless track to move the device 10 as indicated in Figure 2c of the drawings. Motor 48 may be turned off while the device 10 is lowered to the staircase. When the device reaches the top of the staircase as indicated in Figure 2d of the drawings, valve 118 is actuated so as to again extend arm 110. By appropriate manipulation of this valve, as well as by simultaneous use of the handles 138, the device 10 can then be placed in an upright position. If desired, during this last stage, wheels 24 may be engaged with motor 48 by handle 128, to aid in the operation.

The operation of device 10 in descending a stairway is analogous to that described above, except that the steps and their sequence are reversed. It is generally best to lower the device 10 to a horizontal position, with the assistance of arm 110 before it engages a stair. Power is then applied to the endless track to engage the stairs and commence the descent. It is not believed necessary to describe in detail the steps in the operation of device 10 in descending a stairway, these being obvious from the foregoing discussion.

It will be apparent that the embodiment of the present invention hereinabove described does not completely eliminate manual labor on the part of the operator. It is necessary for the operator to assist the device in lowering itself to a horizontal position and in rising to a vertical position. However, the arm 110 sustains the major portion of weight even during the critical stages of these steps. The operator need only apply a reasonable force at handles 138, which are positioned to provide for maximum leverage.

Those skilled in the art will realize that a number of modifications may be made in the construction shown without departing from the essential features of the invention. As an example of such modifications, the hydraulic cylinder 108 can be mounted higher in housing 12 and can be provided with a second arm adapted for telescoping within a first arm. With such modification the stair-climbing device of the present invention obviously would require less effort on the part of the operator while the device changes from a horizontal position to a vertical position or vice-versa. As another example, the wheel means used need not be connected to means for rotating these wheels since an operator can obviously wheel a device of the category defined along a level surface.

Although a specific embodiment of the instant invention has been described and illustrated in detail, it is to be clearly understood that the same is by way of illustration and example only; it is understood that the invention is not limited thereto, as many variations will be readily apparent to those skilled in the art and the invention is to be given its broadest possible interpretation within the terms of the following claims.

I claim:

1. A device of the class described which includes: a housing; wheel means disposed on the bottom of said housing for supporting said housing; endless track means mounted on a side of said housing so as to extend therefrom, said endless track means extending from adjacent to the top of said housing to adjacent to the bottom thereof; means for turning said endless track means; arm means mounted within said housing so as to be capable of movement out through the side thereof adjacent to said endless track means; and means for moving said arm means through said side of said housing adjacent to said endless track means.

2. The device of claim 1 and further including means for turning said wheel means so as to cause said housing to move along a smooth surface.

3. A device of the class described, comprising: a housing; wheel means disposed on the bottom of said housing for supporting said housing; means located on one side of said housing for holding a load; means for moving said load holding means along one side of said housing; endless track means mounted on the other side of said housing so as to extend therefrom, said endless track means extending from adjacent to the top of said housing to adjacent to the bottom thereof; means for turning said endless track means; arm means mounted within said housing so as to be capable of extension outwardly through the side thereof adjacent to said endless track means; and means for moving said arm means through said side of said housing adjacent to said endless track means.

4. A device of the class described, comprising: a housing; wheel means disposed on the bottom of said housing for supporting said housing; means for turning said wheel means so as to cause said housing to move along a smooth surface; means located on one side of said housing for holding a load; means for moving said load holding means along one side of said housing; endless track means mounted on the other side of said housing so as to extend therefrom, said endless track means extending from adjacent to the top of said housing to adjacent to the bottom thereof; means for turning said endless track means; arm means mounted within said housing so as to be capable of movement out through the side thereof adjacent to said endless track means; and means for moving said arm means through the side of said housing adjacent to said endless track means.

5. A device of the class described, comprising: a housing having a front side, an open back side and a bottom; wheel means disposed on said bottom for supporting said housing; means located on the front side of said housing for holding a load; guide means located on the front side of said housing; means attached to said means for holding a load so as to engage said guide means; means for moving said load holding means along said guide means; endless track means mounted within said housing so as to extend through the back side thereof from adjacent to the top of said housing to adjacent to the bottom of said housing; means located within said housing for turning said endless track means; arm means mounted within said housing so as to be capable of movement through said open back side of said housing past said endless track means; and means for moving said arm means through said open side of said housing.

6. A device of the class described, comprising: a housing; wheel means disposed on the bottom of said housing for supporting said housing; means located on one side of said housing for holding a load; endless track means mounted on the other side of said housing so as to extend therefrom, said endless track means extending from adjacent to the top of said housing to adjacent to the bottom thereof; means for turning said endless track means; arm means mounted within said housing so as to be capable of extension outwardly through the side thereof adjacent to said endless track means; and means for moving said arm means through said side of said housing adjacent to said endless track means.

7. A device of the class described, comprising: a housing having a front side, an open back side and a bottom; wheel means disposed on the bottom of said housing for supporting the same; endless track means positioned on said housing adjacent to said open side, said endless track means extending from said housing from adjacent to the top of said housing to adjacent to the bottom of said housing; means for turning said endless track means; an hydraulic cylinder mounted within said housing so that one end thereof is adjacent to said open side; an arm carried within said hydraulic cylinder so as to be movable with respect to said hydraulic cylinder when said hydraulic cylinder is actuated, said arm being capable of being extended through said open side of said housing past said endless track means; and means for actuating said hydraulic cylinder to extend said arm.

8. A device of the class described, comprising: a housing having a front side, an open back side and a bottom; wheel means disposed on the bottom of said housing for supporting the same; means located on said front side of said housing for holding a load; guide means located on said front side of said housing; means attached to said load holding means engaging said guide means; means for moving said means for holding a load along said guide means; endless track means positioned on said housing adjacent to said open side, said endless track means extending from said housing from adjacent to the top of said housing to adjacent to the bottom of said housing; means for turning said endless track means; a hydraulic cylinder mounted within said housing so that one end thereof is adjacent to said open side; an arm carried within said hydraulic cylinder so as to be movable with respect to said hydraulic cylinder when said hydraulic cylinder is actuated, said arm being adapted for extension through said open side of said housing past said endless track means; and means for actuating said hydraulic cylinder to extend said arm.

References Cited in the file of this patent

UNITED STATES PATENTS

| | | |
|---|---|---|
| 1,208,177 | Frost | Dec. 12, 1916 |
| 1,261,944 | Layton et al. | Apr. 9, 1918 |
| 2,740,484 | Montana | Apr. 3, 1956 |

FOREIGN PATENTS

| | | |
|---|---|---|
| 869,537 | Germany | Mar. 5, 1953 |